United States Patent [19]

Eason

[11] Patent Number: 4,890,849
[45] Date of Patent: Jan. 2, 1990

[54] SHAFT SEALS

[75] Inventor: Raymond J. H. Eason, Farnborough, England

[73] Assignee: James Walker & Company Limited, Woking, England

[21] Appl. No.: 608,190

[22] Filed: May 9, 1984

[30] Foreign Application Priority Data

May 17, 1983 [GB] United Kingdom ............... 8313606
Sep. 20, 1983 [GB] United Kingdom ............... 8325070

[51] Int. Cl.$^4$ .................. F16J 15/32; F16J 15/44; F16J 15/46; F16J 15/54
[52] U.S. Cl. .................... 277/27; 277/28; 277/58; 277/70; 277/75; 277/136; 277/174; 277/176; 277/177; 277/198; 277/199; 277/201; 277/206 R; 277/215; 277/227
[58] Field of Search ............... 277/165, 3, 25, 34, 277/206 R, 215, 71, 74, 79, 177, 173, 189, 28, 27, 95, 174, 176, 227, 135, 136, 137; 285/96

[56] References Cited

U.S. PATENT DOCUMENTS

| | | | |
|---|---|---|---|
| 2,153,025 | 4/1939 | Rais | 277/137 |
| 2,628,139 | 2/1953 | Gilliland | 277/177 X |
| 2,732,268 | 1/1956 | Duval | 277/79 X |
| 2,795,195 | 6/1957 | Amblard et al. | 277/135 X |
| 2,871,072 | 1/1959 | Parks et al. | 277/206 R X |
| 2,903,280 | 9/1959 | Cuny | 277/173 X |
| 2,925,296 | 2/1960 | Howlett et al. | 277/215 |
| 2,942,668 | 6/1960 | Maly et al. | 277/165 |
| 2,945,541 | 7/1960 | Maly | 277/165 |
| 2,956,825 | 10/1960 | Hore et al. | 277/27 |
| 3,081,975 | 3/1963 | Sproule et al. | 277/72 X |
| 3,149,848 | 9/1964 | Galloway | 277/165 |
| 3,214,182 | 10/1965 | Herbruggen | 277/215 X |
| 3,285,614 | 11/1966 | McClenathan | 277/136 X |
| 3,331,610 | 7/1967 | Olson | 277/71 |
| 3,471,157 | 10/1969 | Swearingen | 277/135 X |
| 3,514,113 | 5/1970 | Weiswurm | 277/206 R X |
| 3,523,692 | 8/1970 | Otto | 277/165 |
| 3,727,925 | 4/1973 | Jones | 277/165 |
| 3,860,270 | 1/1975 | Arnold | 285/93 |
| 3,915,459 | 10/1975 | Kunderman | 277/27 |
| 3,955,859 | 5/1976 | Stella et al. | 277/70 X |
| 4,089,534 | 5/1978 | Litherland | 277/215 X |
| 4,094,512 | 6/1978 | Back | 277/28 X |
| 4,094,516 | 6/1978 | Morley et al. | 277/215 X |
| 4,189,157 | 2/1980 | Mahan et al. | 277/3 |
| 4,204,689 | 5/1980 | Johansson | 277/27 |
| 4,204,716 | 5/1980 | Baylor | 277/206 R X |
| 4,384,724 | 5/1983 | Derman | 277/3 |
| 4,448,425 | 5/1984 | von Bergen | 277/34 |

FOREIGN PATENT DOCUMENTS 155963 12/1980 Japan ...................... 277/27

Primary Examiner—Allan N. Shoap
Attorney, Agent, or Firm—Wolf, Greenfield & Sacks

[57] ABSTRACT

A shaft seal comprises a housing (22) containing a sealing ring (20,720) consisting of a sleeve (24,724) of plastics such as PTFE and an elastomeric ring (30,730) surrounding the sleeve. The dimensions of the sleeve (22,722) are such that fluid can leak between the sleeve and the shaft (10). Fluid pressure is applied to the elastomeric ring (24,724) to apply radial force to the sleeve (22,722) to reduce the leakage of fluid to an acceptable level while maintaining a hydrodynamically stable fluid film between the sleeve and the shaft. The energizing fluid pressure may be supplied from a separate source, or be derived from the system fluid pressure, for example by allowing the fluid to flow through ports (780) in the elastomeric ring (730) to the annular space (748) between the elastomeric ring and the housing. The fluid film between the sealing ring and the shaft reduces wear on the ring and shaft and reduces the heat generated by friction between the ring and the shaft.

14 Claims, 6 Drawing Sheets

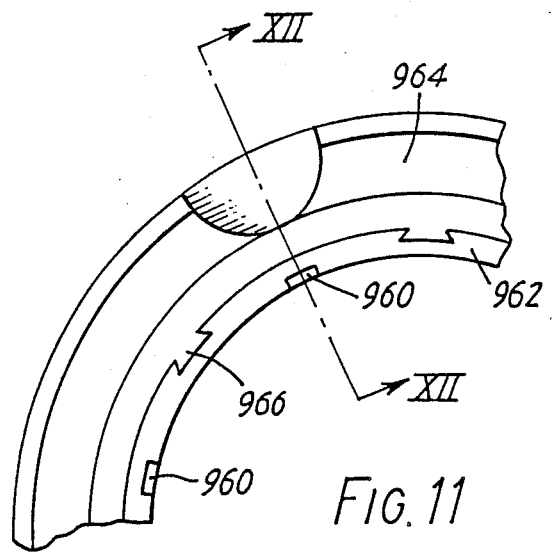
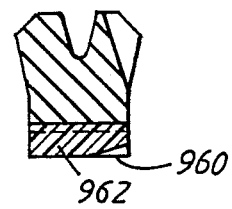
FIG. 11   FIG. 12
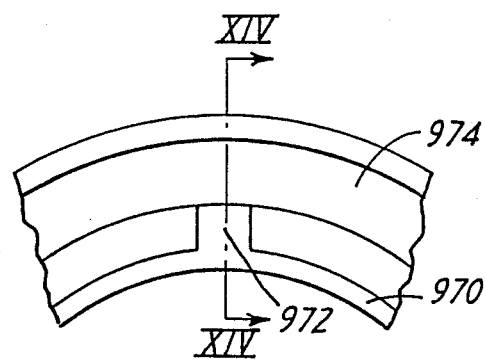
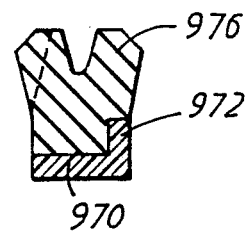
FIG. 13   FIG. 14

SHAFT SEALS

This invention relates to apparatus for sealing the space between a rotating shaft and a stationary member surrounding the shaft.

Conventional gland packings, in which packing rings are forced into radial contact with the shaft by axial pressure exerted through the gland, have the disadvantage that the packing material can lose its lubricant and become hard, so that the radial loading is reduced over a length of time. Such packings rely on boundary lubrication with the shaft and, being in direct rubbing contact with the shaft, significant frictional heating can develop. The consequent localised hardening of the packing can lead to shaft and packing wear. Compression packings also require a relatively large housing space and are not automatic in operation as they rely on externally applied compressive load. Conventional lip seals, in which a sealing lip bears against the shaft under its own resilience or under spring loading, and mechanical face seals have the disadvantage that the rubbing contact between the seal and the shaft, or between the opposed faces of a mechanical seal, cannot be controlled while running. Under conditions of high speed or high temperature, or with frequent start-ups, wear can be rapid, leading to eventual failure of the seal.

There have been proposed shaft seals in which radially inward fluid pressure is applied to a sealing ring to control the pressure of engagement between the ring and the shaft. Examples of such seals are shown in Swiss patent specification No. CH-A-572 587, British patent specification No. GB-A-820 026, West German patent specification No. DE-B-1 032 629 and French patent specification No. FR-A-1 310 018. However, these proposed seals do not solve the problem of heat generated by friction between the sealing ring and the shaft.

The invention consists in apparatus for sealing the space between a rotating shaft and a stationary member surrounding the shaft, comprising a housing surrounding the shaft, a flexible sealing ring contained in the housing and having an inside diameter such that fluid can leak between the sealing ring and the shaft, and means for applying fluid pressure to the sealing ring thereby to apply radially inward pressure to the ring so as to reduce the leakage of fluid between the sealing ring and the shaft whilst maintaining a stable film of fluid between the ring and the shaft. The sealing ring in its unpressurised state may have an inside diameter greater than the outside diameter of the shaft, the fluid pressure applied to the sealing ring acting to reduce the clearance between the ring and the shaft in such a manner as to reduce the leakage of fluid between the sealing ring and the shaft.

The sealing ring preferably comprises a sleeve of PTFE or other suitable material and an elastomeric ring surrounding the sleeve, the fluid pressure being applied between the housing and the elastomeric ring, and the elastomeric ring acting to transmit the radial pressure to the sleeve.

It is found that application of fluid pressure to the sealing ring can reduce the fluid leakage between the sleeve and the shaft to an acceptable level, whilst a stable and controllable film of fluid remains between the sleeve and the rotating shaft. The lack of positive contact between the sleeve and the shaft due to the pressure of the fluid film means that wear of the sleeve and shaft is considerably reduced, as is the heat generated at the seal.

The initial clearance between the shaft and the sleeve may be made as small as possible, provided that it is sufficient to ensure that a hydrodynamically stable fluid film is established in operation between the sleeve and the shaft. It has been found that this condition is normally fulfilled as long as there is no natural interference between the shaft and the sleeve in its unpressurised condition.

It is important that the inner face of the sleeve is accurately cylindrical, and that the sleeve contracts uniformly under radial pressure from the elastomeric ring. The sleeve may be of uniform thickness and may be a push fit in the elastomeric ring. Alternatively, the sleeve may be keyed to the ring, for example by means of projections on one component engaging in complementary recesses in the other component. To prevent non-uniformity of contraction of the sleeve, the projections and recesses are desirably spaced at equal intervals around the sleeve.

The fluid pressure applied to the sealing ring may be supplied from an independent source. This allows the sealing action to be precisely controlled, from a remote location.

Alternatively, the energising fluid pressure can be derived from the pressure of the fluid being sealed, so that the sealing apparatus can be self-contained. For example, in one form of the invention the sealing ring is adapted to be contained in an annular housing so that the elastomeric ring is in sealing engagement with an axial face of the housing on the low pressure side of the sealing ring and so that fluid can flow from the high pressure side of the housing to the space between the elastomeric ring and an outer wall of the housing spaced radially from the elastomeric ring. Preferably, the elastomeric ring is an interference fit between two axially spaced walls of the housing and the elastomeric ring is formed with channels through which fluid can flow from the high pressure side of the sealing ring to the space between the elastomeric ring and the outer wall of the housing.

In one form of the invention, two or more sealing rings are mounted in housings axially spaced from one another, so that only one of the rings is normally energised, the other ring or rings acting as back-up seals, the next adjacent sealing ring becoming energised if the first sealing ring fails. The non-energised sealing rings are subject to negligible wear, since the clearance between the sleeve and the shaft is at its greatest when the sealing ring is not energised, and the fluid between the sleeve and the shaft acts as a lubricant.

The apparatus of this invention may be used in relatively low pressure applications, such as ships' stern glands, where some leakage of fluid past the seal is acceptable. The apparatus may also find use in applications, whether high pressure or low pressure, where zero leakage is required. For example, in one embodiment of the invention, a further sealing device, such as a lip seal, is spaced axially from the sealing ring on the low pressure side of the sealing ring to seal the fluid leaking between the sealing ring and the shaft, and means are provided for draining the leaking fluid from the space between the sealing ring and the further seal.

The invention also includes a sealing ring for use in apparatus as defined above.

The apparatus of this invention can be used to seal liquids or gases, and the energising fluid can similarly be liquid or gas.

The invention will now be described, by way of example with reference to the accompanying drawings, in which.

Figure 1:
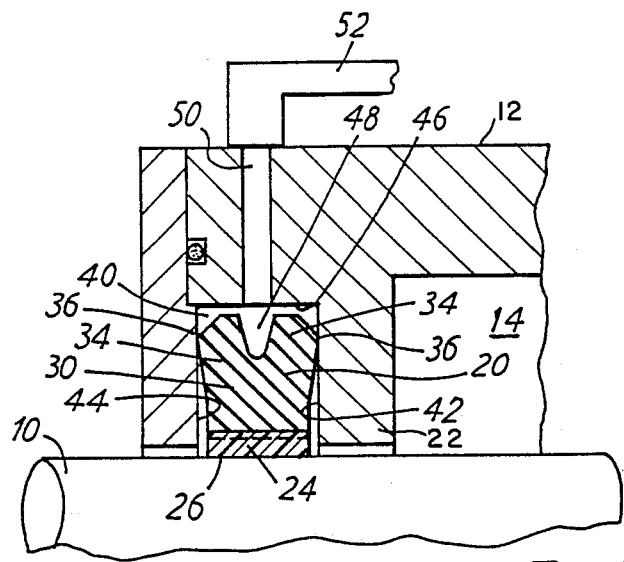
FIG. 1 is a cross-sectional view of apparatus in accordance with the invention.
Figure 4:
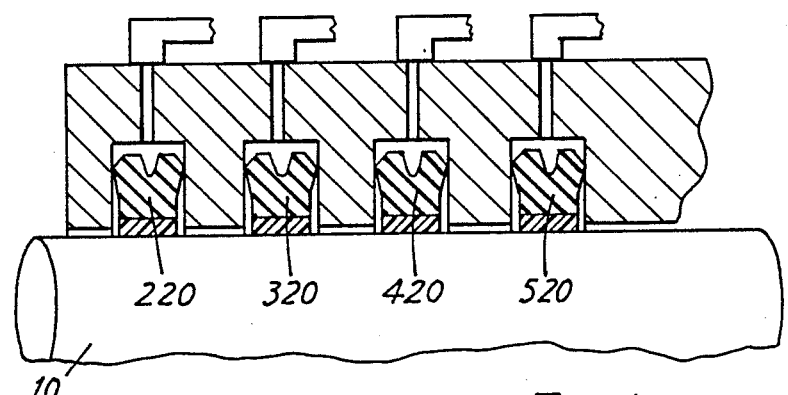
Figure 9:
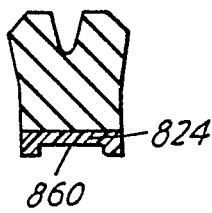
Figure 10:
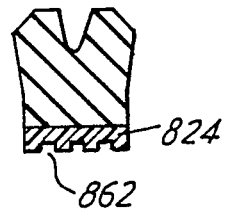
Figure 5:
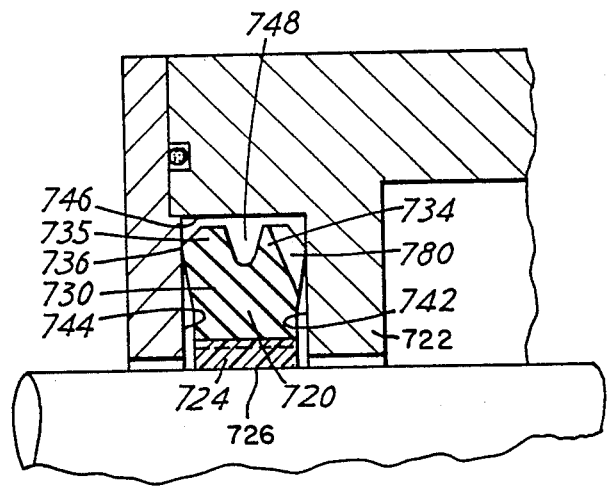
Figure 6:
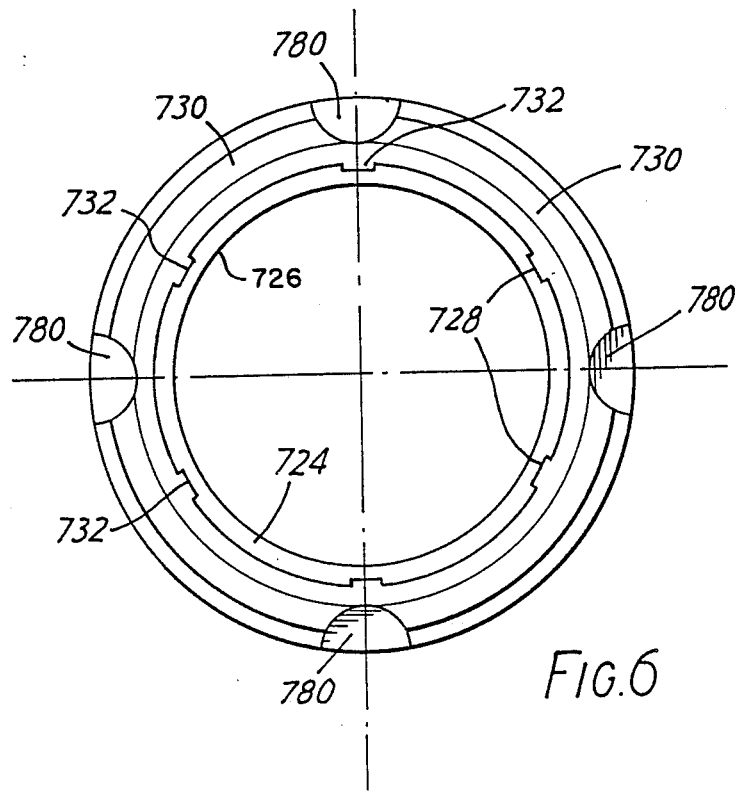
Figure 7:
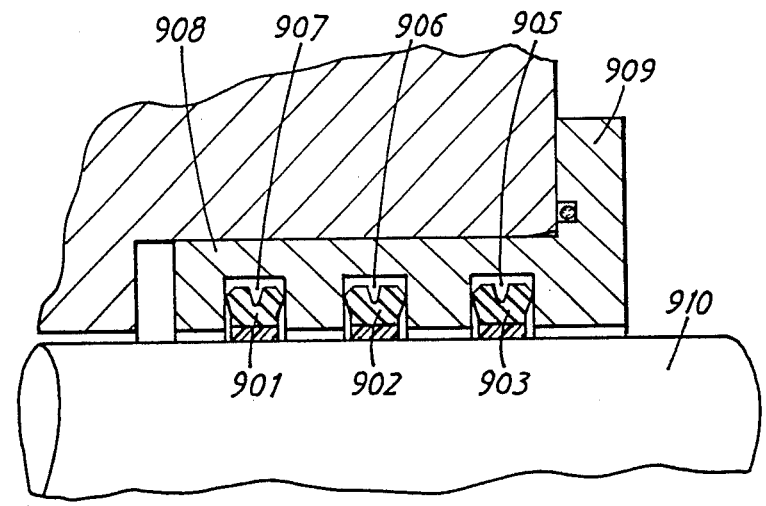
Figure 8:
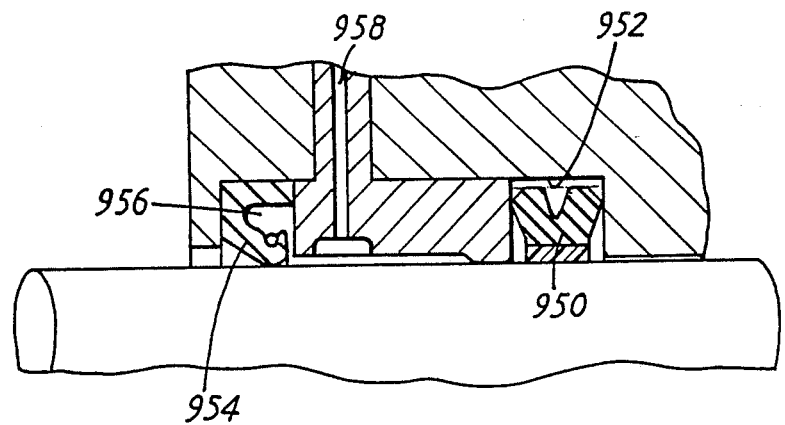
Figure 15:
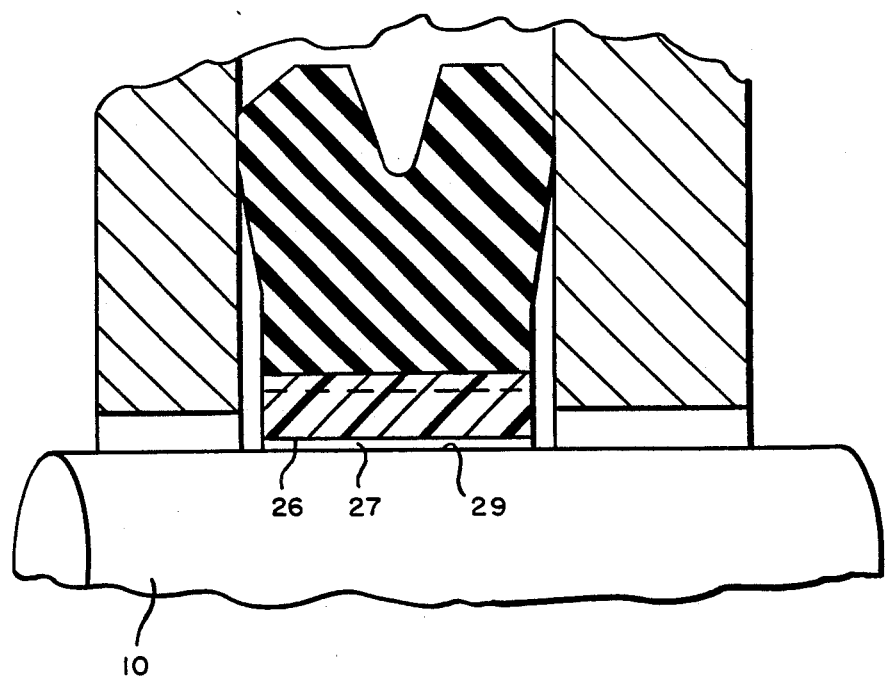

FIG. 4 shows a sealing arrangement using a plurality of sealing rings in accordance with the invention, FIG. 5 is a cross-sectional view of apparatus in accordance with an alternative embodiment of the invention, FIG. 6 is a plan view of the sealing ring of the embodiment of FIG. 5, FIG. 7 shows an apparatus employing a plurality of sealing rings similar to that of FIGS. 5 and 6, FIG. 8 shows apparatus in accordance with the invention for use in applications where zero leakage is required, FIG. 9 is a section through a modified form of sealing ring in accordance with the invention, FIG. 10 is a section through another modified form of sealing ring, FIG. 11 is a fragmentary plan view of a further modified form of sealing ring, FIG. 12 is a section in line XII—XII of FIG. 11, FIG. 13 is a fragmentary plan view of yet another modified form of sealing ring, FIG. 14 is a section on line XIV—XIV of FIG. 13, and FIG. 15 is an enlarge cross-sectional view of part of the apparatus of FIG. 1.

Figure 2:
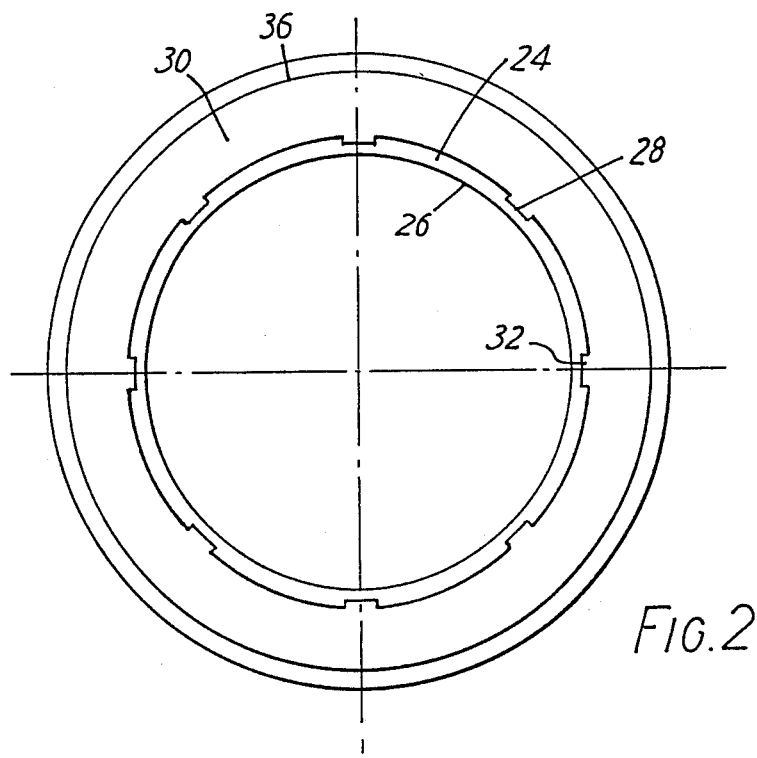
FIG. 2 is a plan view of a sealing ring forming part of the apparatus.

Referring to FIGS. 1 and 2, apparatus is provided for sealing the space between a rotating shaft 10 and a stationary member 12 surrounding the shaft, to control leakage of fluid from the space 14 on one side of the seal. The apparatus comprises a sealing ring 20 fitted in a housing 22. The sealing ring 20 consists of an annular sleeve 24 of PTFE (polytetrafluoroethylene) and an elastomeric ring 30 surrounding the sleeve 24. The sleeve 24 has a cylindrical inner face 26 of a diameter slightly greater than the outside diameter of the shaft 10. The outer cylindrical face of the sleeve 24 is in contact with the inner cylindrical face of the elastomeric ring 30 and is keyed to it by means of spaced projections 28 on the elastomeric ring "30" engaging in complementary recesses 32 in the sleeve 24. The elastomeric ring 30 has two lips 34 each having a sealing edge 36 which is an interference fit with the adjacent side wall 42 or 44 of the housing 22.

The housing 22 comprises an annular recess 40 bounded by two side walls 42 and 44, each perpendicular to the axis of rotation of the shaft 10, and a cylindrical wall 46. The radial depth of the recess is greater than that of the sealing ring 20, so that the wall 46 is spaced from the sealing ring. A bore 50 in the housing 22 leads to the cavity 48 defined between the sealing ring 20 and the cylindrical wall of the recess 40 and is connected through a conduit 52 to a source of fluid under pressure.

The radial clearance 27 (FIG. 15) between the shaft 10 and the inner face 26 of the PTFE sleeve 24 is such that, when no radial pressure is applied to the sealing ring (i.e. when the fluid pressure in the cavity 48 is equal to the ambient pressure), there is considerable leakage of fluid from the space 14 between the shaft and the sleeve. In operation, fluid under pressure is supplied through conduit 52 and bore 50 to the cavity 48, and exerts a radially inward force on the elastomeric ring 30. This force is transmitted through the elastomeric ring to the PTFE sleeve 24 and causes the sleeve to contract, so that the clearance 27 between the sleeve and the shaft 10 is reduced. The sealing engagement of the lips 34 of the elastomeric ring with the side walls 42 and 44 of the recess 40 prevent leakage of the pressurised fluid from the cavity 48. As the fluid pressure applied to the sealing ring increases, the clearance 27 between the PTFE sleeve 24 and the shaft 10 decreases and the leakage of fluid from the space 14 between the sleeve and the shaft decreases. The applied fluid pressure is increased until the leakage from the space 14 reaches an acceptably low level.

As long as the applied fluid pressure is not increased to too high a value, the hydrodynamic forces caused by rotation of the shaft then ensure that the film 29 of fluid between the shaft and the inner face 26 of the PTFE sleeve prevents positive contact between the sleeve and the shaft. Wear on the sealing ring is therefore considerably reduced, as compared with known seals such as conventional gland packings and lip seals, in which there is no adjustment or control of the rubbing contact force between the seal and the shaft. In addition, the lack of positive contact between the sealing ring and the shaft reduces considerably the heat generated in the region of the seal. The gap between the elastomeric ring 30 and the cylindrical wall 46 of the recess 40 allows the sealing ring to "float" in the radial direction, so that it can follow slight misalignment of the shaft 10 without uneven contact being made between the PTFE sleeve and the shaft. The use of fluid pressure to energise the sealing ring enables the sealing, and the leakage through the seal to be precisely controlled, and enables the control to be carried out remotely from the region of the seal.

It has been found that a satisfactorily low leakage rate can be obtained with an applied fluid pressure which is approximately equal to the pressure of the fluid to be sealed. This gives the possibility of using the same fluid to provide the energising pressure, for example by connecting the bore 50 or conduit 52 to a suitable location in communication with the space 14. This has the advantage that a separate source of pressurised fluid is not required. It also has the advantage that, should the system pressure of the fluid to be sealed be reduced for any reason, the energising pressure applied to the sealing ring will simultaneously be reduced, so avoiding the risk of the PTFE sleeve being forced into contact with the shaft owing to the drop in pressure of the film of fluid between the sleeve and the shaft. Similarly, any increase in the system pressure will produce a corresponding increase in the energising pressure.

Figure 3:
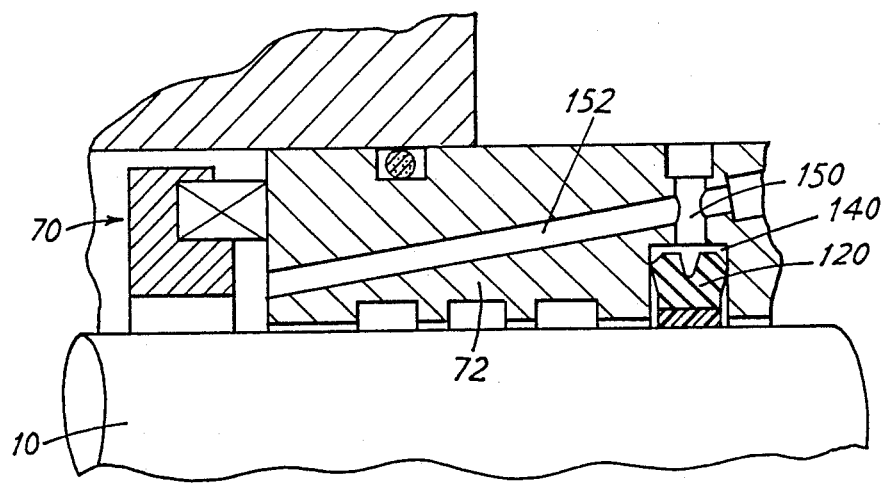
FIG. 3 is a cross-sectional view of apparatus in accordance with the invention used as a back-up seal in conjunction with a mechanical face seal.

FIG. 3 illustrates an application of the sealing apparatus of this invention as a back-up seal used in conjunction with a mechanical face seal, which is indicated diagrammatically at 70. On the low-pressure side of the mechanical seal 70 is arranged a throttle bush 72, which incorporates a housing 140 containing a sealing ring 120 in accordance with the invention. A bore 150 leading to the housing 140 communicates with a bore 152 which opens at its other end into the space between the mechanical seal 70 and the throttle bush 72. Accordingly, the pressure in the housing 140 is normally ambient pressure, and the clearance between the ring 120 and the shaft 10 is at its maximum. This means that wear on the sealing ring 120 is negligible, and the ring can be left in position for a great length of time without the need for maintenance or replacement. However, if the mechanical seal fails, the fluid escaping through the mechanical seal will flow along the bores 152 and 150 to the housing 140, so that the system pressure is applied to the sealing ring 120 to energise it. The sealing ring 120 will then act to prevent or considerably reduce the leakage of fluid beyond the throttle bush 72.

FIG. 4 shows a multi-seal arrangement in which a series of similar sealing rings 220, 320, 420, 520 are arranged in housings spaced along the shaft 10. In operation, the first seal 220 is energised, as in the embodiments described above. The other three seals are not normally energised, but act as reserve seals, to be brought into operation in sequence if the first seal 220 eventually ceases, for whatever reason, to achieve the desired peformance.

FIGS. 5 and 6 show an embodiment of the invention in which the sealing ring 720 consists of a sleeve 724 of PTFE and an elastomeric ring 730. The PTFE sleeve and elastomeric ring are similar to those of the previously described embodiments, and are keyed together by means of a plurality (six in the illustrated embodiment) of projections 728 on the elastomeric ring engaging in recesses 732 in the sleeve. The recesses 732 are equally spaced around the sleeve 730, to avoid any non-uniformity on the compression of the sleeve under the fluid pressure and thus ensure that the inner face 726 of the sleeve remains cylindrical.

The elastomeric ring 730 has two lips 734 and 735 which are an interference fit with the side walls 742 and 744 of the annular housing 722. The lip 735 has a sealing edge 736 which engages the side wall 744 on the low-pressure side of the housing. The lip 734, which engages the wall 742 on the high-pressure side of the housing, is formed with a number (four in the illustrated embodiment) of channels 780 through which fluid can flow from the high-pressure side of the sealing ring to the space 748 in the housing between the sealing ring and the cylindrical outer wall 746 of the housing.

In use, the system pressure of the fluid being sealed is transmitted, through the channels 780 in the lip 734 of the elastomeric ring, to the space 748, so that radial pressure is exerted on the sealing ring as in the previously described embodiments. The interference fit of the lip 734 on the side wall 742 ensures that the sealing edge 736 of the other lip 735 is pressed against the side wall 744 when the system pressure is low, e.g. at start-up, so that there is no leakage of fluid past the lip 735.

Since no special channels in the housing are needed to transmit the fluid pressure to the space 748 to energise the sealing ring, the housing can be a simple recess. This sealing ring is therefore easy to fit, and takes up very little space.

FIG. 7 illustrates a sealing device comprising three sealing rings 901, 902 and 903 mounted in respective housings 907, 906 and 905 axially spaced along the shaft 910. Each sealing ring is similar to the sealing ring shown in FIGS. 5 and 6, and fits into its housing in the same way. The housings 905, 906 and 907 are annular recesses formed in a cylindrical body 908 which is shaped to fit into the space normally occupied by a conventional gland packing. The body 908 is held in place by any suitable means, such as a retaining flange 909. The sealing device can therefore be used to replace conventional packings in existing installations.

In use of the sealing device, the sealing ring 901 nearest the high pressure side of the assembly normally acts as the primary seal, the sealing ring being energised by the system pressure, as in the embodiment of FIGS. 5 and 6. The fluid leakage through the sealing ring 901 flows between the outer two sealing rings 902 and 903, providing lubrication for those rings, before emerging as leakage between the end of the housing 909 and the shaft 910. The second sealing ring 902 is subject only to the low pressure of the leaking fluid and is therefore not energised. The third sealing ring 903 is similarly not energised. If the first sealing ring 901 fails for any reason, the system pressure is applied on the adjacent sealing ring 902, with the result that the sealing ring 902 will be energised, and will take over the primary sealing function. Similarly, if the sealing ring 902 also fails, the third sealing ring 903 will be energised and take over the sealing function. The second and third rings 902 and 903 therefore act as back-up seals, coming into operation automatically if the first sealing ring fails. Since the second and third sealing rings 902 and 903 are not energised whilst the first sealing ring is functioning normally, the clearance between the PTFE sleeves of the second and third rings and the shaft is at its maximum, and the rings are effectively lubricated by the fluid leakage between the sleeves and the shaft. The wear on the back-up sealing rings is therefore negligible.

In use of sealing rings in accordance with the present invention, it has been found that, except at low pressures during start-up, the rate of leakage of fluid between the inner sleeve and the shaft is substantially constant irrespective of the pressure difference between the high pressure and low pressure sides of the seal (i.e. between the system pressure and ambient pressure), and remains so even at high pressure. This is in contrast to conventional seals, in which high pressures can either cause a corresponding increase in leakage to unacceptable levels, or can cause the seal to be effectively hydraulically energised such that leakage is completely stopped, with the usual result that the seal quickly overheats and subsequently fails completely. This characteristic of sealing rings of this invention, of allowing a substantially constant leakage, gives rise to the possibility of their use to provide an acceptable seal under conditions which combine both high pressures and high peripheral shaft speeds. This is in addition to their being suitable for relatively low pressure applications such as the stern gland applications referred to above.

FIG. 8 illustrates one arrangement which can be used for any pressure conditions including high pressure applications. A sealing ring 950 in accordance with the invention is mounted in a housing 952. The sealing ring is similar to that shown in FIGS. 5 and 6, though it could be a sealing ring of the kind shown in FIGS. 1 and 2, with the housing provided with suitable means for supplying energising pressure to the sealing ring. Axially spaced from the sealing ring 950, on the low-pressure side of the ring, is a conventional seal, which may for example, as shown in FIG. 8, be a spring-loaded lip seal 954, mounted in a suitable housing 956. A channel 958 opens into the space between the two sealing rings 950 and 954, to allow the fluid leaking past the sealing ring 950 to be drained away, to prevent build-up of pressure in the space. In use, the sealing ring 950 acts as a throttle, controlling leakage even at very high system pressures. The conventional seal 954 provides a final seal, and is subject only to the low pressure of the leakage fluid drained off through channel 958.

FIGS. 9 to 14 show some possible modifications of the previously described embodiments. FIG. 9 shows a modification of the sealing ring of FIGS. 1 and 2 or FIGS. 5 and 6, in which the radially inner face of the PTFE sleeve 824 is formed with a centrally disposed annualr groove 860. FIG. 10 shows another embodiment, in which the inner face of the sleeve 824 is formed with a series of parallel grooves 862. The groove or grooves in these embodiments have the effect of increasing the volume of fluid which, in use, fills the clearance between the sleeve and the shaft. The grooves reduce the area of the sleeve which is in contact with the shaft through the fluid film, so creating a higher sealing force in relation to the energising pressure. It will be appreciated that various other profiles could be used for the inner face of the sleeve.

FIGS. 11 and 12 show a modification of the sealing ring in which a number of narrow angled grooves 960 are formed in the sleeve 962, on the high pressure side of the seal. The grooves are equally spaced around the ring, and act to encourage the development of the fluid film between the sleeve and the shaft, without significantly reducing the effective area of the film. FIG. 11 also illustrates a modified way of keying the sleeve 962 to the elastomeric ring 964, in which the projections 966 which fit into complementary recesses in the sleeve are dovetail shaped. Such an interlocking connection between the two components may be particularly useful when the seal is operating at high pressures.

FIGS. 13 and 14 illustrate an alternative way of keying the two components together, which may also be useful at high pressures, for example greater than 2000 kNm$^{-2}$. The sleeve 970 is formed with a number of lugs 972, spaced at equal intervals around the sleeve. Each lug 972 extends radially outwards from the edge of the sleeve on the low-pressure side of the sealing ring, and fits into a complementary recess in the elastomeric ring 974. The radial dimension of each lug 972 is sufficient to ensure that the sleeve and elastomeric ring are locked together, whilst not interfering with the sealing action of the adjacent lip 976 of the elastomeric ring.

It will be appreciated that the sleeve and elastomeric ring may be keyed together in other ways, or may be bonded to one another. In some circumstances it may be sufficient for the sleeve to be a push fit in the elastomeric ring.

The initial clearance between the shaft and the sleeve of a sealing ring in accordance with the invention may be made as small as possible, provided that it is sufficient to ensure that a hydrodynamically stable fluid film is established in operation between the sleeve and the shaft. It has been found that this condition is normally fulfilled as long as there is no natural interference between the shaft and the sleeve in its unpressurised condition. Where the sealing ring is used as an auxiliary seal, as in the embodiments of FIG. 3, 4 or 7, it is important that the sleeve is a free running fit on the shaft, to avoid frictional losses when the sealing ring is not energised.

FIG. 15 illustrates diagramatically the clearance 27 between the sleeve 24 and the shaft 10 in the embodiment of FIG. 1, the radial dimension of the clearance being exaggerated for the sake of clarity. It will be appreciated that a similar clearance is present in the embodiments of the other Figures, and the clearances in those Figures are therefore not separately shown.

The dimensions of the sealing ring will depend on various factors, including the material of the components of the sealing ring and the diameter of the shaft. For example, it has been found that the sealing ring shown in FIGS. 1 and 2 or FIGS. 5 and 6 can be made with the following approximate dimensions. For use with a shaft of diameter of, for example, 60 mm to 100 mm, the combined radial depth of the elastomeric ring and sleeve may be approximately 12 mm, with the radial thickness of the PTFE sleeve being 2 mm, and the overall axial length of the sealing ring being 9 mm. With such a sealing ring, the initial clearance between the shaft and the sleeve may be of the order of 0.10 to 0.15 mm.

For larger diameter shafts the dimensions of the sealing ring can be greater, though they do not need to increase in proportion with the shaft size. For example, with shafts of diameter from 100 to 250 mm, a sealing ring of radial depth of about 15 mm with an axial length of about 12 mm may be suitable, whilst for larger diameter shafts the radial depth and axial length may be increased to say, 20 mm and 15 mm.

In the described embodiments, the sleeve is preferably formed from PTFE suitably loaded, e.g. with glass or phosphorbronze. It will be appreciated however that other suitable materials could be used for the sleeve. The elastomeric ring may be formed from any suitable material, such as rubber.

It will be appreciated that other modifications could be made in the described embodiments, for example the elastomeric ring may have a profile different from that of the described embodiments.

I claim:

1. Apparatus for sealing the space between a rotating shaft and a stationary member surrounding the shaft, thereby to reduce leakage of fluid under pressure along the shaft, comprising a housing surrounding the shaft, having at least one axially-facing internal wall on the low pressure side of the housing and a generally cylindrical internal wall facing the shaft, a sealing ring contained in the housing and having an overall radial depth less than that of the housing so that the ring can float radially in the housing, the sealing ring comprising a flexible sleeve of plastic material and an elastomeric ring surrounding the sleeve, the sleeve having an inner surface which in the relaxed state of the sealing ring has a diameter greater than that of the shaft so that a positive clearance exists between the sleeve and the shaft, the elastomeric ring being in sealing engagement with said axially-facing internal wall and means being provided on the elastomeric ring to allow the fluid being sealed to flow from the high pressure side of the housing to the space between the elastomeric ring and the said cylindrical wall of the housing, so as to apply fluid pressure between the housing and the elastomeric ring thereby to apply radially inward pressure to the sleeve to reduce the clearance between the sleeve and the shaft while maintaining a positive clearance between the sleeve and the shaft so as to maintain a stable film of fluid between the sleeve and the shaft.

2. Apparatus as claimed in claim 1, in which the housing has a second axially-facing internal wall, the elastomeric ring is an interference fit between said two axially-facing walls, and said means for allowing fluid flow comprises channels in the elastomeric ring through which the fluid can flow from the high pressure side of the sealing ring to the space between the elastomeric ring and said cylindrical wall of the housing.

3. Apparatus as claimed in claim 1, and comprising a plurality of sealing rings mounted in respective housings axially spaced from one another.

4. Apparatus as claimed in claim 1, in which a further sealing device is spaced axially from the sealing ring on the low pressure side of the sealing ring to seal the fluid leaking between the sealing ring and the shaft, and means are provided for draining the leaking fluid from the space between the sealing ring and the further sealing device.

5. Apparatus as claimed in claim 1, in which the sealing ring is used as a reserve seal, being positioned on the low-pressure side of a further seal and being normally non-energised, there being provided means for applying fluid pressure to energise the sealing ring if the further seal fails in operation.

6. Apparatus as claimed in claim 1, in which the sleeve or the elastomeric ring is formed with equally circumferentially spaced projections which engage in recesses in the other component to prevent relative rotational movement between the two components.

7. Apparatus as claimed in claim 6, in which each projection comprises a lug extending radially outwards from the edge of the sleeve on the low pressure side of the sealing ring and engaging in a complementary recess in the elastomeric ring.

8. Apparatus as claimed in claim 1, in which the sleeve is formed with one or more annular grooves in its radially inner face.

9. Apparatus as claimed in claim 1, in which the sleeve is formed with grooves in its radially inner face, extending partway across the face from the edge of the sleeve on the high pressure side, to encourage the development of the fluid film between the ring and the shaft.

10. A sealing ring for sealing the space between a rotating shaft and a housing surrounding the shaft, thereby to reduce leakage of fluid under pressure along the shaft, comprising a flexible sleeve of plastic material and an elastomeric ring surrounding the sleeve, and having an overall radial depth less than that of the housing so that the ring can float radially in the housing, the sleeve having an inner surface which in the relaxed state of the sealing ring has a diameter greater than that of the shaft so that a positive clearance exists between the sleeve and the shaft to allow leakage of fluid between the sleeve and the shaft, the elastomeric ring being an interference fit between two axially spaced walls of the housing and being formed with channels through which fluid can flow from the high pressure side of the sealing ring to the space between the elastomeric ring and a generally cylindrical wall of the housing surrounding the elastomeric ring, whereby the fluid pressure between the housing and the elastomeric ring applies radially inward pressure to the sleeve so as to reduce the clearance between the sleeve and the shaft thereby to control leakage of fluid between the sleeve and the shaft while maintaining a positive clearance between the sleeve and the shaft so as to maintain a stable film of fluid between the sleeve and the shaft.

11. A sealing ring as claimed in claim 10, in which the sleeve or the elastomeric ring is formed with equally circumferentially spaced projections which engage in recesses in the other component to prevent relative rotational movement between the two components.

12. A sealing ring as claimed in claim 10, in which each projection comprises a lug extending radially outwards from the edge of the sleeve on the low pressure side of the sealing ring and engaging in a complementary recess in the elastomeric ring.

13. A sealing ring as claimed in claim 10, in which the sleeve is formed with one or more annular grooves in its radially inner face.

14. A sealing ring as claimed in claim 10, in which the sleeve is formed with grooves in its radially inner face, extending partway across the face from the edge of the sleeve on the high pressure side, to encourage the development of the fluid film between the ring and the shaft.

* * * * *